United States Patent
Nakamura

(10) Patent No.: US 8,529,094 B2
(45) Date of Patent: Sep. 10, 2013

(54) PORTABLE ELECTRONIC DEVICE HAVING A PLURALITY OF LIGHT ELEMENTS AND METHOD OF ILLUMINATING SAME

(75) Inventor: Masatsugu Nakamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 452 days.

(21) Appl. No.: 12/418,508

(22) Filed: Apr. 3, 2009

(65) Prior Publication Data

US 2009/0267522 A1    Oct. 29, 2009

(30) Foreign Application Priority Data

Apr. 25, 2008  (JP) .................................. 2008-116396

(51) Int. Cl.
*F21V 23/04*  (2006.01)
(52) U.S. Cl.
USPC ...................... 362/276; 362/249.05
(58) Field of Classification Search
USPC ................. 362/276, 249.05–249.06
See application file for complete search history.

(56) References Cited

U.S. PATENT DOCUMENTS

| | | | | |
|---|---|---|---|---|
| 7,307,518 | B2 * | 12/2007 | Bogos | 340/479 |
| 2002/0167488 | A1 * | 11/2002 | Hinckley et al. | 345/156 |

FOREIGN PATENT DOCUMENTS

| | | |
|---|---|---|
| JP | 2001-094638 | 4/2001 |
| JP | 2003-169108 | 6/2003 |
| JP | 2005-092667 | 4/2005 |
| JP | 2005-252871 | 9/2005 |
| JP | 2008-035429 | 2/2008 |
| JP | 2008-054137 | 3/2008 |

OTHER PUBLICATIONS

Office Action from Japanese Patent Application No. 2008-116396, mailed on Apr. 20, 2010.
Office Action from Japanese Patent Application No. 2008-116396, mailed on Aug. 8, 2010.

* cited by examiner

*Primary Examiner* — Robert May
(74) *Attorney, Agent, or Firm* — Duane Morris LLP

(57) ABSTRACT

A portable electronic device operable to indicate received media is disclosed. A first set of lighting units is used to indicate a received media based on an orientation of the portable electronic device. A second set of the lighting units may be activated based on a change in the orientation of the portable electronic device.

13 Claims, 9 Drawing Sheets

FIGURE 1A
FIGURE 1B
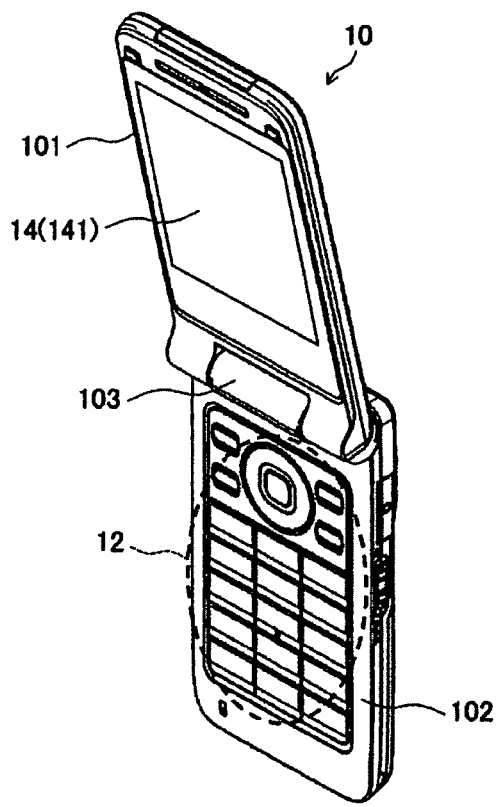
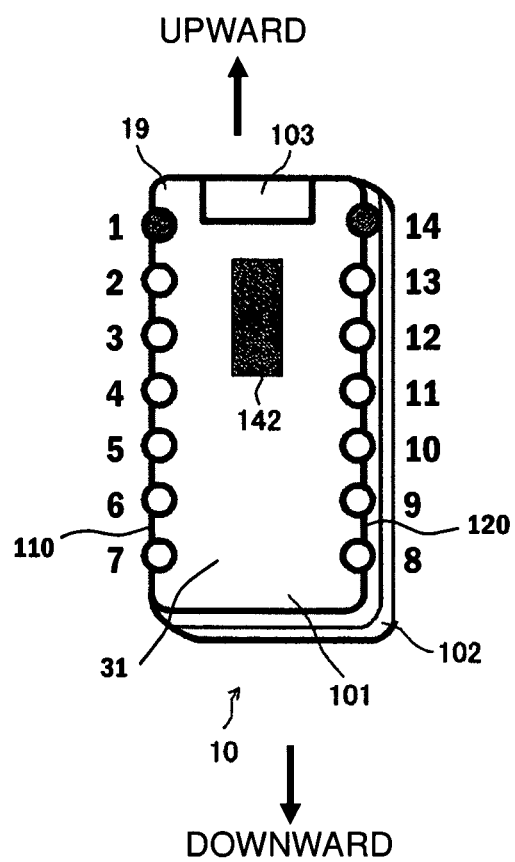

PORTABLE ELECTRONIC DEVICE HAVING A PLURALITY OF LIGHT ELEMENTS AND METHOD OF ILLUMINATING SAME

CROSS-REFERENCE TO RELATED APPLICATION

The present application claims priority under 35 U.S.C. §119 to Japanese Patent Application No. 2008-116396, filed on Apr. 25, 2008, entitled "PORTABLE ELECTRONIC DEVICE," the content of which is incorporated by reference herein in its entirety.

FIELD OF INVENTION

Embodiments of the present invention relate generally to portable electronic devices, and more particularly relate to a portable electronic devices capable of detecting the direction of the housing thereof.

BACKGROUND OF THE INVENTION

Portable electronic devices such as mobile phones may have a notification function using lighting units such as Light Emitted Diodes (LED's). The lighting units are located on the outer surface of one or more housings. The lighting units can notify users by lighting their LED's when incoming calls or emails are received.

However, the users may not hold or carry the portable electronic device with the outer surface of the housings, having the LED's, facing them. Thus, the user may not see the LED's being lit thereby missing the notification. Therefore, there is a need for further improvement in the notification method of portable electronic devices.

SUMMARY

A portable electronic device operable to indicate received media is disclosed. A first set of lighting units is used to indicate a received media based on an orientation of the portable electronic device. A second set of the lighting units may be activated based on a change in the orientation of the portable electronic device.

A first embodiment comprises a portable electronic device. The portable electronic device comprises a housing, a plurality of lighting units arranged on a surface of the housing, and a gradient detector module for detecting direction of the housing. The portable electronic device further comprises a control module for controlling to illuminate a subset of the lighting units based on the orientation of the housing.

A second embodiment comprises a method for illuminating a portable electronic device. The method comprises providing a plurality of lighting units in a substantially linear arrangement on a housing of the portable electronic device. The method further comprises illuminating a first lighting unit from the plurality of lighting units at a first end of the substantially linear arrangement based on an orientation of the housing determined by a gradient detector module.

A third embodiment comprises a method for illuminating a portable electronic device. The method comprises providing a plurality of lighting units in a substantially closed loop arrangement on a housing of the portable electronic device. The method further comprises illuminating the plurality of lighting units in a circular direction based on an orientation of the housing determined by a gradient detector module.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention.

FIG. 1A illustrates an external perspective view of a portable electronic device in an open position according to an embodiment of the invention.

FIG. 1B illustrates an external perspective view of a portable electronic device shown in FIG. 1A in a folded position according to an embodiment of the invention.

DETAILED DESCRIPTION OF EXEMPLARY EMBODIMENTS

Figure 2:
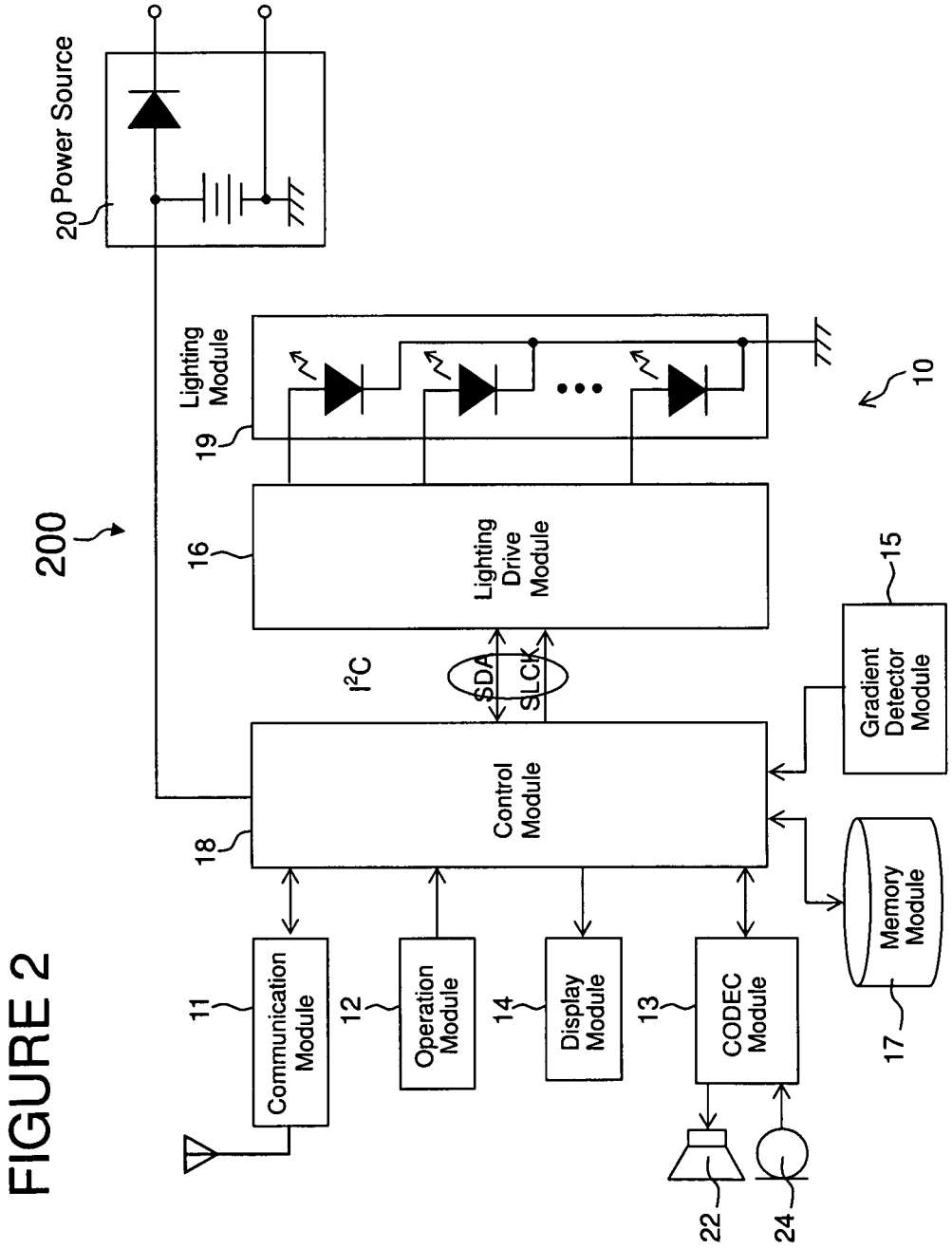
FIG. 2 illustrates a schematic block diagram of a system for a portable electronic device according to an embodiment of the invention.

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, indicating receiving of an incoming voice call. Embodiments of the invention, however, are not limited to handling incoming voice calls, and the techniques described herein may also be utilized for indicating data reception. For example, embodiments may be applicable to received emails and the like. Additionally, embodiments of the invention are not limited to the mobile phone applications, and other device such as, without limitation, a laptop computer, a PDA, a game machine, and the like, may also be used.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

Embodiments of the invention are described using a foldable mobile phone as an example of the portable electronic device.

FIGS. 1A and 1B illustrate external perspective views of a portable electronic device 10 (mobile phone) in an open position and a closed position respectively according to an embodiment of the invention. The portable electronic device 10 is capable of communicating with external devices such as a base station, or the like. As shown in FIG. 1A, the portable electronic device 10 includes an upper housing 101, a lower housing 102 and a hinge unit 103.

The upper housing 101 includes a display module 14 or a main screen 141 as explained in more detail below, and a sub-screen 142 (FIG. 1B). The display module 14 is located on a surface of the portable electronic device 10 that is not exposed to the outside when the portable electronic device 10 is in the closed position. The sub-screen 142 is exposed to the outside when the portable electronic device 10 is in the closed position (FIG. 1B).

A plurality of lighting units for incoming call display are mounted on a first edge 110 and second edge 120 on the surface 31 of the upper housing 101. The lighting units may form a substantially linear arrangement on the housing 101/102, such as on the first edge 110 and/or second edge 120. In this example 14 LED's 1-14 are mounted on the surface 31, LED's 1-7 are mounted on the first edge 110 and LED's 8-17 are mounted on the second edge 120. An outside (surface) of the LED's 1-14 are protected by a translucent acryl sheet that covers the upper housing 101.

The LED's are arranged in two banks. A first bank comprising LED's 1-7, and a second bank comprising LED's 8-14. The first bank and the second bank of LED's are arranged on opposing LED banks (e.g., in FIG. 1B: LED 1 is mounted opposite LED 14, LED 2 is mounted opposite LED 13, . . . , and LED 7 opposite is mounted opposite LED 8) on upper housing 101. The LED mounted position for the current time is LED_a, the LED mounted position of the previous time is LED_b. Here a and b are any of the numbers from 1 to 14. The total number of LED/2 is variable N (e.g., N=7 since a total of 14 LED's are used).

The lower housing 102, includes an operation module (not shown) located on a surface that is not exposed to the outside when the portable electronic device 10 is in the closed position. The operation module is described in detail below.

A gradient detector module (not shown) for detecting the directions (inclination of the housing based on the usage scene) of the upper housing 101 and the lower housing 102 is also mounted in the interior of the lower housing 102. The gradient detector module is described in more detail below.

The hinge 103 comprises a hinge mechanism that opens/closes the upper housing 101 and the lower housing 102, and includes a rotation shaft, which allows the transition between the opened position of the portable electronic device 10 shown in FIG. 1A and the closed position shown in FIG. 1B.

The opened position/closed position of the portable electronic device 10 is monitored by a built-in control module (not shown). The control module can detect the closed position of the portable electronic device 10. Specifically, the control module detects the closed position by monitoring whether or not a detection switch (not shown) of the lower housing 102 is pushed by a projection (not shown) arranged on the upper housing 101. In this manner, the control section detects a closed position if the detection switch is pushed and detects an opened position otherwise. The open/closed positions can also be detected by other devices, for example, by various types of sensors.

FIG. 2 illustrates a schematic block diagram of a system 200 for the portable electronic device 10 according to an embodiment of the invention. The system 200 may comprise a communication module 11, an operation module 12, a coder/decoder (CODEC) module 13, a display module 14, a gradient detector module 15, a lighting drive module 16, a memory module 17, a control module 18, a lighting module 19, and a power source 20.

The communication module 11 is operable to transmit and receive a plurality of communication signals including data signals via a communication module 11 transceiver (not shown). The communication module 11 is also operable to carry out a radio communication with a network side device via a mobile communication network (not shown) such as a base station communicatively coupled to the mobile communication network (not shown). The communication module 11 transceiver communicates with a base station transceiver via a wireless data communication link (not shown). The communication module 11 transceiver cooperates with the base station transceiver with a suitably configured RF antenna arrangement (not shown) that can support a particular wireless communication protocol and modulation scheme. The data signals may include, without limitation, voice data during voice communication, text data during email, and web data during accessing web site.

The operating module 12 may comprise an input pad with keys for performing various functions which can be activated by the user. For example keys may comprise a power supply key, a phone call key, a numeric key, a letter key, a direction key, a decision key, a call originating key, a determination key, and the like. In response to activation of at least one of the keys (activated key), a signal corresponding to a content of operation is transmitted to the controller module 18. The control module 18 receives the signal and determines the corresponding instruction associated with the activated key. For example, the keys may be used to send a text message or make a voice call.

The CODEC module 13 carries out a process for outputting a voice signal output from the speaker 22 and receiving a voice signal input in the microphone 24. The CODEC module 13 amplifies the voice input from the microphone 24, and carries out an analogue/digital conversion to obtain a digital voice input. The CODEC module 13 applies a signal processing such as an encoding or the like to the digital voice input to obtain an encoded digital voice input, and sends the encoded digital voice input to the control module 18.

The CODEC module 13 is also operable to apply a signal processing to a digital voice data supplied from the control module 18. The CODEC module 13 performs decoding, digital/analogue conversion, and amplification, of the digital voice data to convert it into an analogue voice signal for output to the speaker 22.

The display module 14 includes a main screen 141 and a sub-screen 142 constructed by using display devices, for example, a liquid crystal display panel (LCD), or an organic electro-luminescence (OEL) device, which is formed by arranging a large number of pixels, that is, a combination of lighting elements of a plurality of colors in a matrix form.

The display module 14 displays an area corresponding to an image signal supplied from the controller module 18. The image signal may correspond to target data such as a document written in a predetermined region (VRAM region) of the memory module 17. The display module 113 displays various information and images on the main screen 141, for example, a telephone number of a received call, a call waiting telephone number, contents of a received email, contents of an outgoing email, success and failure of calls, a standby screen, contents of a document, contents of a web site, and the like on the main screen 141. Also, the display module 14 displays various information and images on the sub screen 142, for example, date, time, remaining battery level, and the like.

The gradient detector module 15 can be mounted on the lower housing 102 of the portable electronic device 10 to detect the directions of the upper housing 101 and the lower housing 102 (housings 101 and 102 are collectively referred to as the housing hereinafter), and may be configured by a triaxial acceleration sensor.

The detection method of the triaxial acceleration sensor comprises a capacitance sensor and a piezoresistance sensor. In this manner, the gradient and the acceleration can be detected as a function of change in capacitance of the electrode. The piezoresistance sensor detects the gradient based on change in a resistance value of the piezoresistance sensor. The resistance value increases/decreases when tension or compression stress is applied through mechanical external force and the like, that is, when acceleration is applied on the piezoresistance element formed on a silicon monocrystalline substrate through a semiconductor manufacturing process such as ion implantation device and the like.

The output voltage of the triaxial acceleration sensor is the sum of the voltage caused by acceleration and the zero offset voltage. The zero offset voltage is the differential voltage with respect to the referenced voltage when the acceleration is not applied.

Similar to the control module 18, a lighting drive module 16 receives supply of power from one or more batteries in the power source 20, and selectively drives a plurality of LED's in the lighting module 19. The lighting module 19 is coupled to the lighting drive module 16, which is controlled by the control module 18.

In the embodiment shown in FIG. 2, the lighting module 19 includes 14 ports for driving 14 LED's. When receiving calls, illuminating characteristic of the LED's are controlled through an Inter-Integrated circuit ($I^2C$) bus from the control module 18. The illuminating characteristics, includes, for example, an illuminating pattern, an illuminating order, an illuminating time, and the like.

The $I^2C$ bus is a serial bus comprising two lines, serial data (SDA) and serial clock (SCLK) pulled up with a resistor (not shown). The $I^2C$ bus transmits and receives command and data according to the $I^2C$ protocol between the IC's of the microprocessor configuring the control module 18, and an IC of the lighting drive module 16 driving the lighting module 19.

The memory module 17 is operable to store various kinds of data used for various processes of the portable electronic device 10. In practical embodiments, the memory module 17 may comprise, for example, a non-volatile storage device (non-volatile semiconductor memory, hard disk device, optical disk device, and the like), a random access storage device (for example, SRAM, DRAM), or any other form of storage medium known in the art. For example, the memory module 17 may store a computer program which is executed by the control module 18, an address book for managing personal information such as a telephone number and e-mail address of a communication party, an audio file for reproducing a ring tone and alarm tone, an image file for a standby screen, various kinds of setting data, a temporary data used in a program process, and the like. The memory module 17 may be coupled to the control module 18 such that the control module 18 can read information from and write information to memory module 17. As an example, the control module 18 and memory module 17 may reside in their respective ASIC's. The memory module 17 may also be integrated into the control module 18. In an embodiment, the memory module 17 may include a cache memory for storing temporary variables or other intermediate information during execution of instructions to be executed by the control module 18. The memory module 17 may also include non-volatile memory for storing instructions to be executed by the control module 18.

The control module 18 controls overall operation of the portable electronic device 10. For example the control module 18 may control operations of the portable electronic device 10 so that processes of the portable electronic device 10 are suitably performed. These processes may include, without limitation, voice communication performed over a line switching network, composing and transmitting/receiving e-mail, browsing web sites on the Internet, and the like. Furthermore, the operation of each control block controlled by the control module 18 may include transmission/reception of signals at the communication module 11, retrieval of operation input from the operation module 12, audio input/output at the CODEC module 13, display of image at the display module 14, acquisition of gradient data from the gradient detector module 15, drive of the lighting control by the lighting drive module 16, and the like. The control module 18 may comprise a computer (microprocessor) or another processor for performing a process based on a program (operating system, application program, etc.) stored in the memory module 17. The control module 18 may read instruction code sequentially from programs such as the operating system and the application program which are stored in the memory module 17, and perform the programs. For example, the data processing in the control module 18 to illuminate the lighting unit positioned relatively at the top of the plurality of lighting units when the direction of the housing is detected by the gradient detector module may be realized on the computer by one or a plurality of programs, or may be at least partially realized by hardware.

The control module 18 further performs control to illuminate the LED positioned relatively near the hinge 103 of lighting module 19 to illuminate the lighting module 19 based on an orientation of the portable electronic device 10 indicated by the gradient detector module 15. For example, the control module 18 illuminates a first LED, the LED 1 in the lighting module 19 when the hinge 103 is positioned in a relatively upward direction (i.e., relatively opposite the direction of gravity—FIG. 1B). For another example, the control module 18 illuminates a second LED, the LED 7 when the hinge 103 is positioned in a relatively downward direction (i.e., relatively with the direction of gravity—FIG. 1B).

The control module 18 may illuminate the second LED (LED 7) after the first LED (LED 1) is illuminated. The control module 18 illuminates the second LED to notify the user of received information such as an incoming call, or an email. Also the control module 18 illuminates the lighting module 19 when a change in the orientation of the portable electronic device 10 is detected by the gradient detector module 15. The change in the orientation is measured relative to a current orientation.

To illuminate the lighting module 19, the control module 18 sequentially illuminates LED's (e.g., LED 2 through LED 6 in FIG. 1) arranged between LED 1 and LED 7 in a sequential ascending order starting from the LED 1. In this case, the LED 7 is illuminated after the other LED's (i.e., 2-6) are illuminated, that is, it is illuminated last. LED 7 also is illuminated when there is information to be received according to the control module 18.

The lighting units of the portable electronic device may be arranged in a substantially closed loop arrangement on the housing, and illuminated in a circular pattern based on an orientation of the housing determined by the gradient detector module 15.

Figure 3:
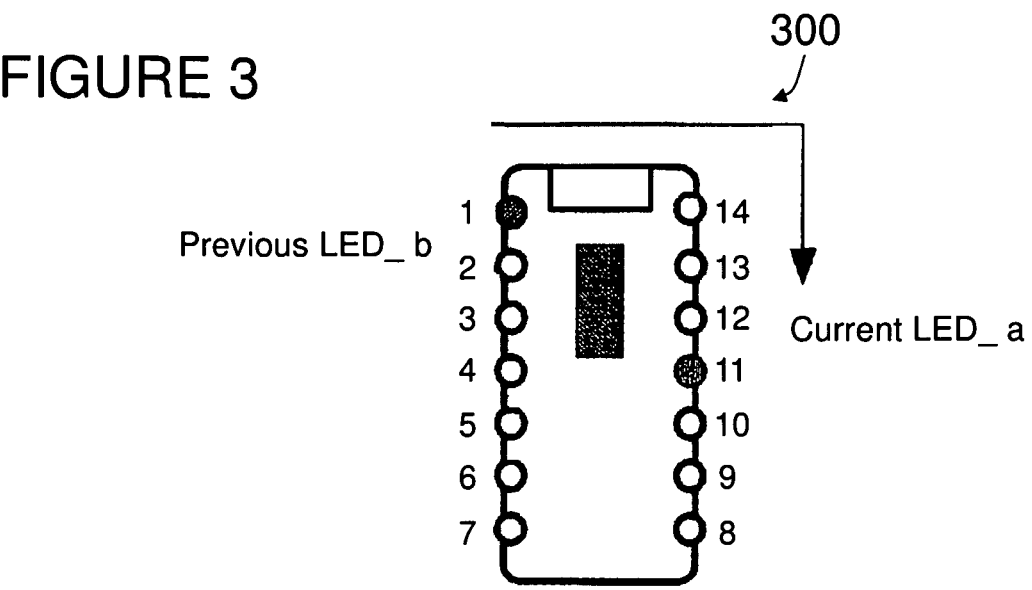
FIG. 3 illustrates an exemplary pattern of lighting units of the portable electronic device according to an embodiment of the invention.

FIG. 3 illustrates an exemplary pattern of lighting units of the portable electronic device according to an embodiment of the invention. FIG. 3 shows a mounting arrangement diagram of the LED showing an illuminating example of determining whether to illuminate the 14 LED's in the clockwise direction or the counterclockwise direction when the previous LED_b=1 and the current LED_a=11.

Figure 4:
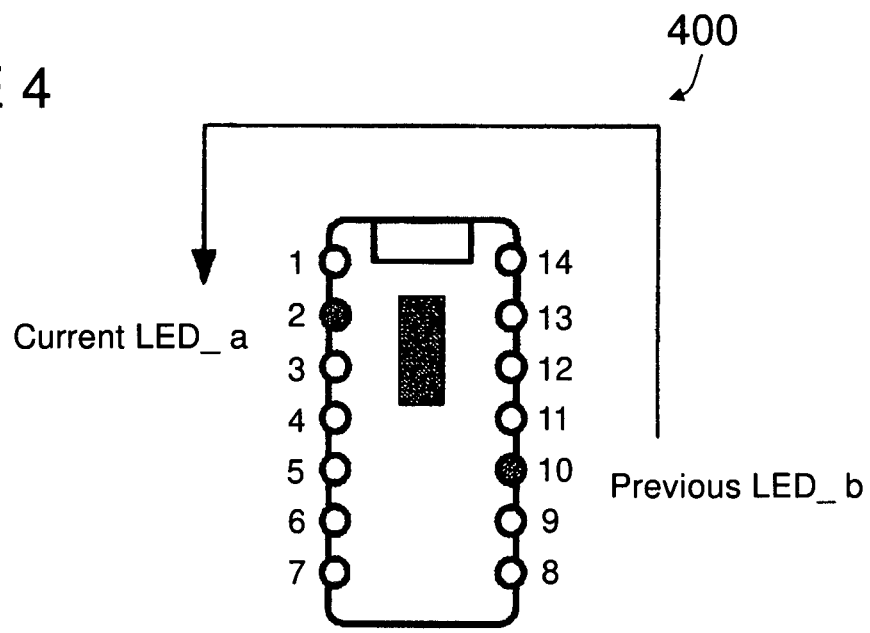
FIG. 4 illustrates an exemplary pattern of lighting units of the portable electronic device according to an embodiment of the invention.

FIG. 4 illustrates an exemplary pattern of lighting units of the portable electronic device according to an embodiment of the invention. FIG. 4 shows a mounting arrangement diagram of the LED showing another illuminating example of determining whether to illuminate the 14 LED's in the clockwise direction or the counterclockwise direction when the previous LED_b=10 and the current LED_a=2.

Figure 5:
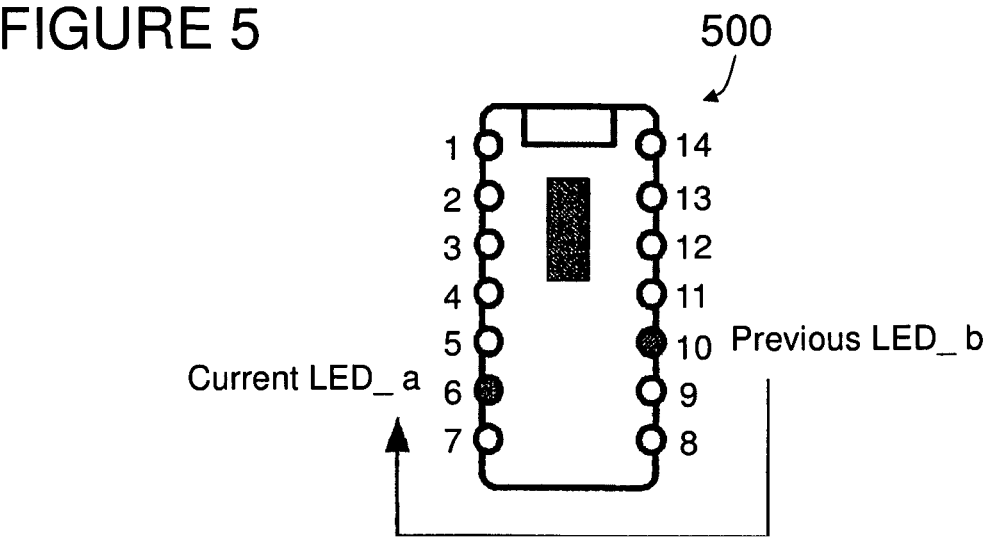
FIG. 5 illustrates an exemplary pattern of lighting units of the portable electronic device according to an embodiment of the invention.

FIG. 5 illustrates an exemplary pattern of lighting units of the portable electronic device according to an embodiment of the invention. FIG. 5 shows another illuminating example of determining whether to illuminate the 14 LED's in the clockwise direction or the counterclockwise direction when the previous LED_b=10 and the current LED_a=6.

Figure 6:
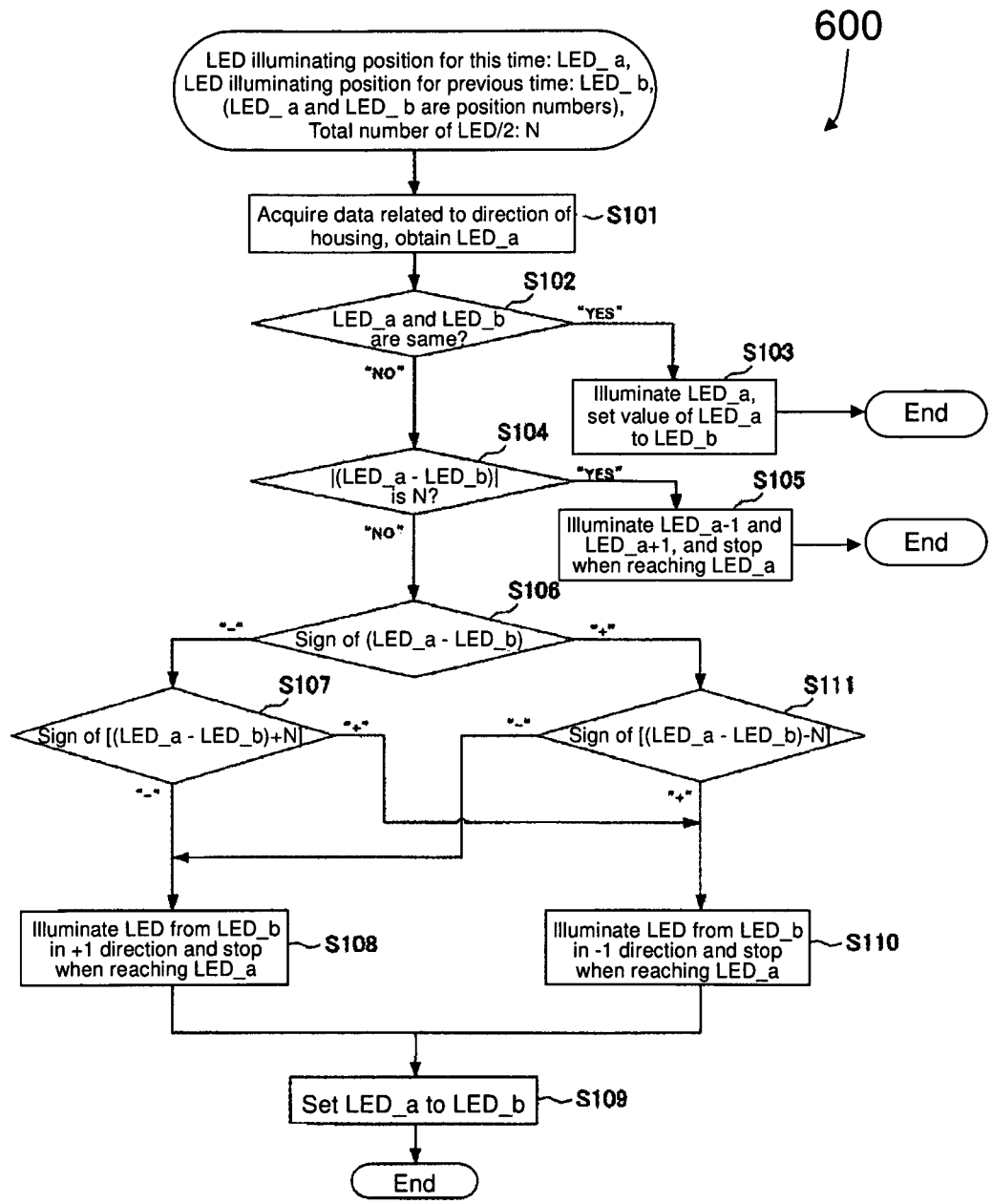
FIG. 6 is a flowchart showing an exemplary process for detecting the direction of the housing of the portable electronic device.

FIG. 6 is a flowchart showing an exemplary process 600 for detecting the direction of the housing of the portable electronic device 10. The various tasks performed in connection with these processes may be performed by software, hardware, firmware, a computer-readable medium having computer executable instructions for performing the process method, or any combination thereof. It should be appreciated that process 600 may include any number of additional or alternative tasks. The tasks shown in FIG. 6 need not be performed in the illustrated order, and these processes may be incorporated into a more comprehensive procedure or process having additional functionality not described in detail herein. For illustrative purposes, the following description of process 600 may refer to elements mentioned above in connection with FIGS. 1-5. In various embodiments, portions of process 600 may be performed by different elements of portable electronic device 10, e.g., the control module 18 and the lighting module 19.

In process 600, the control module 18 performs control to illuminate the LED's in ascending order from the LED 1 near hinge 103.

Process 600 may begin by, the control module 18 acquiring data (gradient data) related to the orientation of the housing from the gradient detector module 15 mounted in the interior of the lower housing 102, and obtains the mounted position number of the LED_a (i.e., 1-14) to be illuminated at a current time (step S101). The control module 18 then compares the mounted position number of the LED_a to the mounted position number of the LED_b (inquiry step S102), and continues to illuminate the LED_a if the mounted positions of the LED_a and the LED_b are the same ("YES" branch of inquiry step S102), and sets the mounted position number of the LED_a, to the mounted position number of the LED_b (step S103), and process 600 terminates.

However, if the control module 18 determines that the mounted position number of the LED_a and the LED_b are not the same ("NO" branch of inquiry step S102), the control module 18 determines whether the absolute value of difference between the mounted position number of the LED_a and the LED_b (LED_a−LED_b) is equal to N (e.g., N=number of LED's/2=7) (step S104). If the absolute value of (LED_a−LED_b) is equal to N ("YES" branch of inquiry step S104), the mounted position number of LED_a and the LED_b are arranged on opposing edges 110 and 120 of the upper housing 101. Thus the control module 18 performs the process of illuminating both LED's positioned at LED_a-1 and LED_b+1, and stopping the illumination control of the lighting module 19 when the illumination of the LED_a is reached (step S105). Process 600 then ends.

However, if the control module 18 determines that the absolute value of (LED_a−LED_b) is not equal to N ("NO" branch of inquiry step S104), the control module 18 determines the ± sign of the (LED_a−LED_b) (step S106). If the control module 18 determines that the sign of (LED_a−LED_b) is negative ("−"branch of inquiry step S106), the control module 18 further determines the ± sign of ((LED_a−LED_b)+N) (step S107). If control module 18 determines that sign of ((LED_a−LED_b)+N) is "−" ("−"branch of inquiry step S107), the control module 18 sequentially performs the illumination control of the lighting module 19 in the +1 direction (i.e., counter clockwise) of the LED_b, and stops the illumination control of the lighting module 19 when the illumination of the LED_a is reached (step S108). The control module 18 then sets the value of the LED_a to the LED_b (step S109). Process 600 then ends.

If the control module 18 determines that sign of ((LED_a−LED_b)+N) is "+" ("+" branch of inquiry step S107), the control module 18 sequentially performs the illumination control of the lighting module 19 in the −1 direction (clockwise) of the LED_b, and stops the illumination control of the lighting module when reaching the illumination of the LED_a (step S100), sets the value of the LED_a to the LED_b process (step S109) and process 600 then ends.

However, if the control module 18 determines that sign of (LED_a−LED_b) is + ("+" branch of inquiry step S106), the control module 18 further determines the ± sign of the ((LED_a−LED_b)+N) (inquiry step S111). If the control module 18 determines that the sign of the ((LED_a−LED_b)+N) (inquiry step S111) is "−", the control module 18 sequentially performs the illumination control of the lighting module 19 in the +1 direction (i.e., counter clockwise) of the LED_b, and stops the illumination control of the lighting module 19 when reaching the illumination of the LED_a (step S108), sets the value of the LED_a to the LED_b (step S109), and process 600 ends. If the control module 18 determines that the sign of the ((LED_a−LED_b)+N) "+" ("+" branch of inquiry step S111), the control module 18 sequentially performs the illumination control of the lighting module 19 in the −1 direction (i.e., clockwise) of the LED_b, and stops the illumination control of the lighting module 19 when reaching the illumination of the LED_a (step S110), sets the value of the LED_a to the LED_b (step S109), and process 600 ends.

The following illuminating examples are described below in connection with FIGS. 3-6.

For the first example, process 600 (FIG. 6) determines whether to illuminate the 14 LED's in the clockwise direction or the counterclockwise direction when the previous LED_b=1 and the current LED_a=11 (FIG. 3). In this case, LED_a≠LED_b in (inquiry step S102). Thus, the control module 18 makes a NO determination and since |LED_a−LED_b|=10≠7 in the determination process of (|LED_a−LED_b|=N) of step S104, the control module 18 makes a NO determination as well and proceeds to the ± determination process of (LED_a−LED_b) of step S106. Here, since (LED_a−LED_b)=10, the control module 18 makes a + determination, and proceeds to the ± determination process of ((LED_a−LED_b)−N) of step S111. Here, "11−1−7=3", and thus the control module 18 makes a + determination.

In this manner, the control module 18 controls the ports of the lighting drive module 16 and performs illumination control of the lighting module 19 in the clockwise (−1) direction, and stops the drive control of the lighting module 19 when the LED_a is illuminated for a predetermined time (step S110). The control module 18 sets a mounted position number "11" to the LED_b to hold the mounted position for the current time, and terminates the process (step S109).

For the second example, process 600 (FIG. 6) determines whether to illuminate the 14 LED's in the clockwise direction or the counterclockwise direction when the previous LED_b=10 and the current LED_a=2 (FIG. 4).

In this case, LED_a≠LED_b in the comparison determination process of inquiry step S102. Thus, the control module 18 makes a NO determination, and since |LED_a−LED_b|=8≠7 in the determination of (|LED_a−LED_b|=N) (inquiry step S104), the control module 18 makes a NO determination as well and proceeds to the ± determination process of (LED_a−LED_b) of step S106. Here, since (LED_a−LED_b)=−8, the control module 18 makes a − determination, and proceeds to the ± determination process of ((LED_a−LED_b)+N) of step S107. Here, "2−10+7=−1", and thus the control module 18 makes a − determination.

Therefore, the control module 18 controls the ports of the lighting drive module 16 and performs illumination control of the lighting module 19 in the counterclockwise direction, and stops the drive control of the lighting module 19 when the LED_a is illuminated for a predetermined time (step S108). The control section sets a mounting position number "2" to the LED_b to hold the mounted position for the current time (step S109), and process 600 ends.

For the third example, process 600 (FIG. 6) determines whether to illuminate the 14 LED's in the clockwise direction or the counterclockwise direction when the previous LED_b=10 and the current LED_a=6 (FIG. 5).

In this case, LED_a≠LED_b in the comparison determination process of inquiry step S102. Thus, the control module 18 makes a NO determination, and since |LED_a−LED_b|=4≠7 in the determination of (|LED_a−LED_b|=N) of inquiry step S104, the control module 18 makes a NO determination and proceeds to the ± determination process of (LED_a−LED_b) of step S106. Here, since (LED_a−LED_b)=6+10+7=3 in step S106, the control module 18 makes a + determination.

Therefore, the control module 18 controls the lighting drive module 16 and performs illumination control of the lighting module 19 in the clockwise direction, and stops the drive control of the lighting module 19 when the LED_a is illuminated for a predetermined time (step S100). The control module 18 sets a mounted position number "6" to the LED_b to hold the mounted position for the current time (step S109), and process 600 ends.

As described above, according to an embodiment of the invention, the visibility of the annunciation such as an incoming call by the portable electronic device 10 improves by illuminating the lighting unit (LED) relatively positioned as described above. Thus, the lighting unit (LED) can be more effectively used as an annunciating means. Furthermore, the representation effect is obtained by sequentially illuminating the lighting units in ascending order, whereby the visibility further improves. The illumination may start from a first lighting unit and proceed to a second lighting unit. In addition to sequential illumination, the visibility further improves by illuminating the lighting unit ultimately positioned substantially near the top of the portable electronic device 10.

According to an embodiment of the invention, a plurality of lighting units is mounted at the edges 110/120 or in an annular form on the surface 31 of the upper housing 101. The illuminating position of the lighting unit is sequentially changed to obtain the representation effect according to the inclination of the housing based on the usage scene. In this case, the direction (clockwise direction or counterclockwise direction) in which the relative movement distance is short is selected through calculation from the LED mounted position for the previous time and the LED mounted position for the current time, and the lighting unit is sequentially illuminated. In this manner, the lighting units are illuminated while interpolating the movement of the illuminating pattern by the lighting units even when the inclination is rapidly changed.

The variable N is an even number in the embodiments described above. According to another embodiment of the invention the variable N may be an odd number such as a total number of LED's of 13 as described below.

Figure 7:
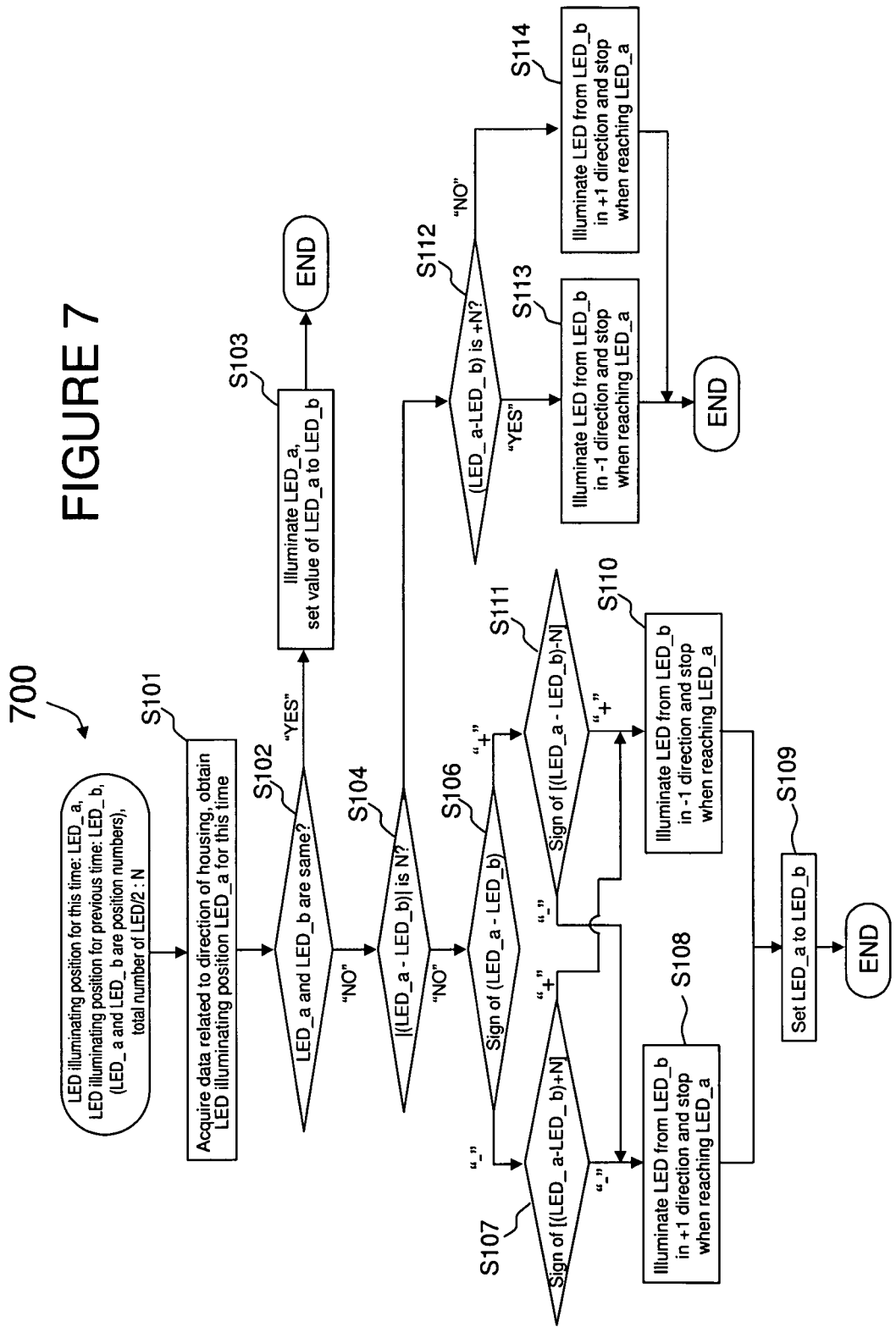
FIG. 7 is a flowchart showing an exemplary process for selecting lighting units of the portable electronic device according to an embodiment of the invention.

FIG. 7 is a flowchart showing an exemplary process 700 for selecting lighting units of the portable electronic device 10 according to an embodiment of the present invention. The various tasks performed in connection with these processes may be performed by software, hardware, firmware, a computer-readable medium having computer executable instructions for performing the process method, or any combination thereof. It should be appreciated that process 700 may include any number of additional or alternative tasks. The tasks shown in FIG. 7 need not be performed in the illustrated order, and these processes may be incorporated into a more comprehensive procedure or process having additional functionality not described in detail herein. For illustrative purposes, the following description of process 700 may refer to elements mentioned above in connection with FIGS. 1-2. In various embodiments, portions of process 700 may be performed by different elements of portable electronic device 10, e.g., the control module 18 and the lighting module 19. Process 700 may share same definitions and functionalities as explained above in the context of process 600, therefore these definitions and the functionalities may not be redundantly explained herein.

The control module 18 first acquires data related to the direction of the housing from the gradient detector module 15 mounted in the interior of the lower housing 102, obtains the mounted position of the LED to illuminate for this time (step S101), and thereafter, performs the same control as discussed in the embodiment shown in FIG. 6 (steps S101 to S111).

If control module 18 determines that the absolute value of (LED_a−LED_b) is equal to N ("YES" branch of inquiry step S104), the LED_a and the LED_b are arranged on opposing surfaces (edges 110/120) as discussed above. Thus, the control illuminates both the LED_a−1 and the LED_b+1, and stop the drive control of the lighting unit at when reaching the illumination of the LED_a is performed. The control module 18 further determines whether or not (LED_a−LED_b) is equal to N (step S112). Since the total number of LED is 13 in this example, N=13/2=6.5. In this case, process 700 omits the fraction so that N=6+1, and thus the variable N=7, similar to the embodiment described in above in the context of discussion of FIG. 6. If the control module 18 determines that (LED_a−LED_b) is equal to N ("YES" branch of inquiry step S112), the control module 18 sequentially performs the illumination control of the lighting unit in the −1 direction (clockwise) of the LED_b, and stops the illumination control of the lighting unit when reaching the illumination of the LED_a (step S113), and process 700 ends. If the control module 18 determines that (LED_a−LED_b) is not equal to N ("NO" branch of inquiry step S112), the control module 18 sequentially performs the illumination control of the lighting unit in the +1 direction (counter clockwise) of the LED_b, and stops the illumination control of the lighting unit when reaching the illumination of the LED_a (step S114), and terminates the process.

Therefore, the visibility of the annunciation such as incoming call by the portable electronic device 10 improves by illuminating the lighting unit (LED) relatively positioned as described above without depending on the total number of LED's of the lighting module 19. Thus, similar to the embodiment shown in FIG. 5, the lighting unit can be more effectively used as the annunciation means. Furthermore, in this embodiment, a plurality of lighting units is mounted on an end or in an annular form on the surface of the upper housing 101. The illuminating position of the lighting unit is sequentially changed to obtain the representation effect according to the inclination of the housing based on the usage scene.

In this case, the direction (clockwise direction or counterclockwise direction) in which the fewest number of lighting units (LED's) are illuminated (relative movement distance is shortest) is selected. The shortest distance is calculated using the LED mounted position at the previous time and the LED mounted position at the current time. In this manner, the lighting units are sequentially illuminated, so that lighting units are illuminated while interpolating the illuminating pattern (its movement) by the lighting unit even when the inclination of the portable electronic device 10 rapidly changes.

Figure 8A:
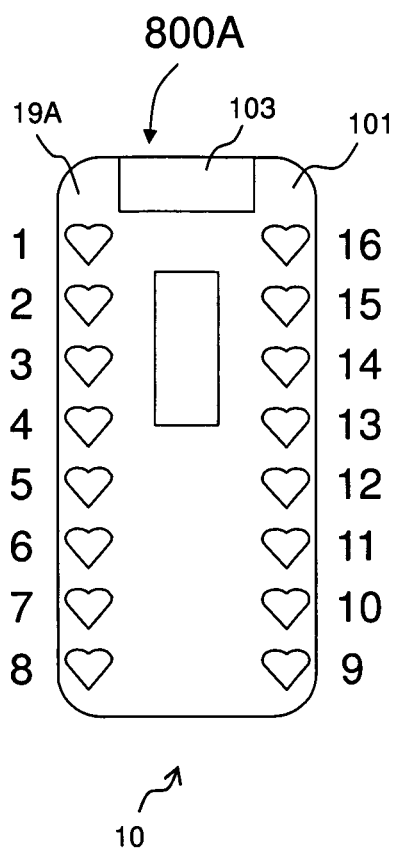
FIG. 8A illustrates an external perspective view of a portable electronic device according to an embodiment of the invention, viewed from a first housing.
Figure 8B:
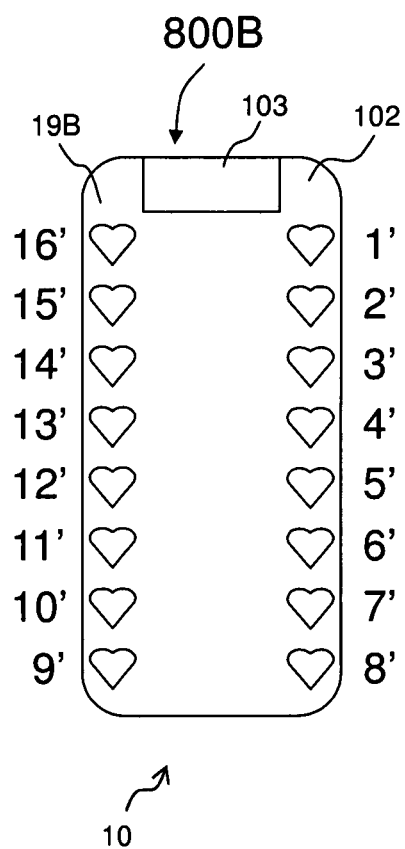
FIG. 8B illustrates an external perspective view of the portable electronic device shown in FIG. 8A, viewed from a second housing.
Figure 9:
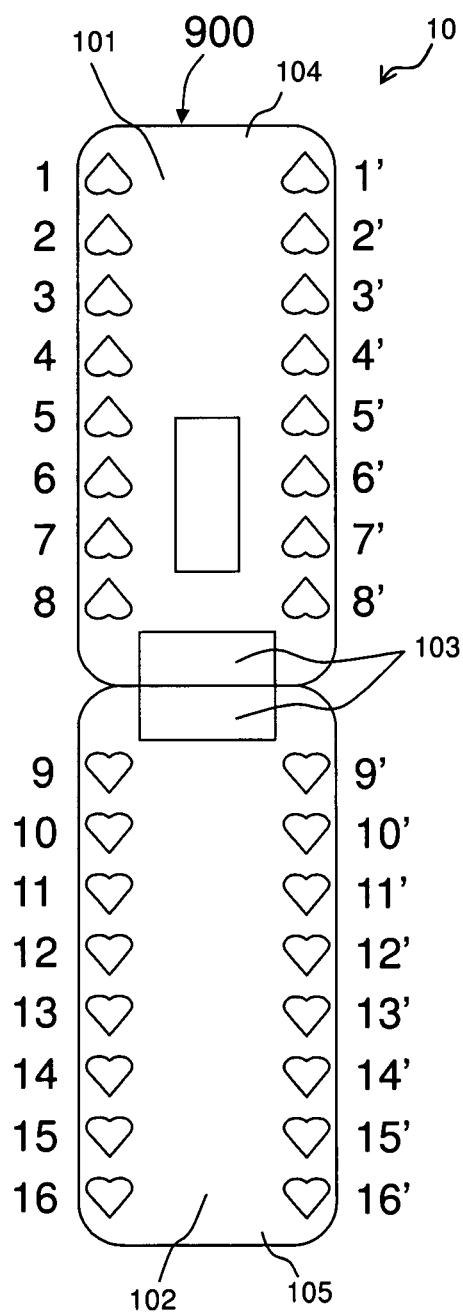
FIG. 9 illustrates an exemplary pattern of lighting units of the portable electronic device in a position in which the upper housing is on the top and the lower housing is on the bottom.
Figure 10:
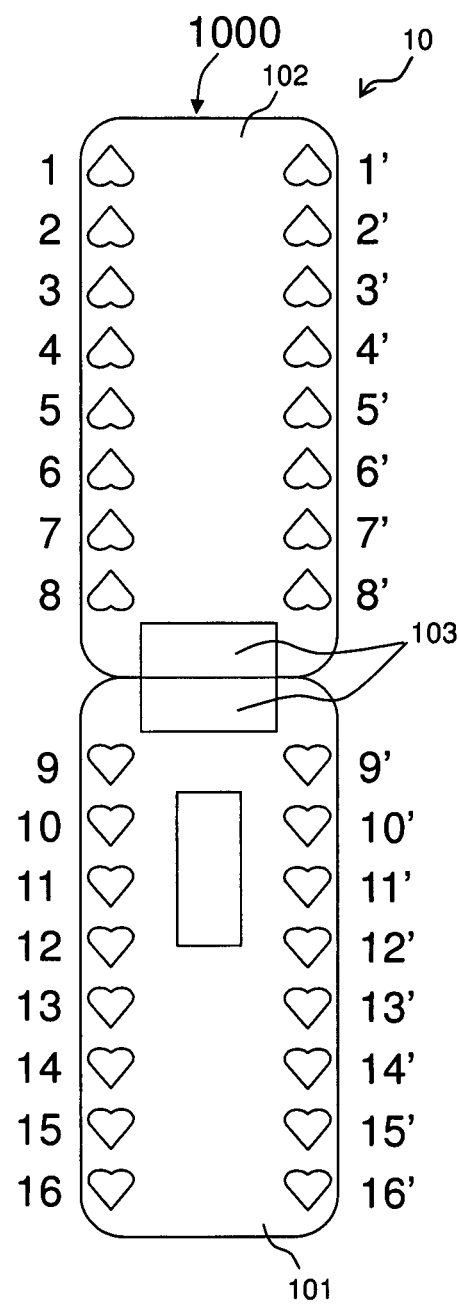
FIG. 10 illustrates an exemplary pattern of lighting units of the portable electronic device in a position in which the lower housing is on the top and the upper housing is on the bottom.

In one embodiment, a lighting unit is arranged on the outer side of both the upper housing 101 and the lower housing 102 as described below. FIGS. 8A and 8B show the portable electronic device 10 in a position where housing is closed. FIGS. 9 and 10 show the portable electronic device 10 in a position where the housing is open. FIGS. 9 and 10 show the lighting unit arranged on the outer side of the housing, where the upper housing 101 is on the top in FIG. 9 and the lower housing 102 is on the top in FIG. 10. FIG. 9-10 may share same definitions and functionalities as explained above in the context of FIGS. 1-7 above, therefore these definitions and the functionalities may not be redundantly explained herein.

The upper housing 101, the lower housing 102, and the hinge unit 103 are coupled in a freely turning manner. The lighting module 19 is arranged on the upper housing 101 in the above embodiments shown in FIGS. 1-5, whereas the lighting module 19 (19A/19B) is located in both the upper housing 101 and the lower housing 102 in this embodiments.

Each lighting window of the lighting module 19 has a heart shape, which is another difference with the embodiments explained above. The shape of the lighting window is not limited thereto, and any desired shape, without limitation, such as circular, elliptical, polygonal (square, rectangle, hexagon, etc.), star shape (★ shape), character-shape (+, −, A, α), cross and the like may be used.

First, the position in which the housing is closed will be described using FIGS. 8A and 8B. FIG. 8A illustrates an external perspective view 800A of the portable electronic device 10 according to an embodiment. The lighting module 19A is arranged on the surface on the outer side of the upper housing 101. The lighting module 19A includes lighting windows assigned with numbers 1 to 16 in the counterclockwise direction and the LED for each window is mounted in the window. The lighting module 19B is arranged on the surface on the outer side of the lower housing 102. The lighting module 19B includes lighting windows assigned with numbers 1' to 16' in the clockwise direction.

FIG. 8B illustrates an external perspective view 800B of the portable electronic device 10 shown in FIG. 8A, viewed from the lower housing 102. In the closed position, the number of each lighting window of the lighting module 19A of the upper housing 101 corresponds to the number of each lighting window of the lighting module 19B of the lower housing 102. That is, the lighting windows having the same number face each other with the housing in between. For example, the lighting window 1 and the lighting window 1' face each other, and similarly, the lighting window 2 and the lighting window of 2', the lighting window 3 and the lighting window of 3', and so on face each other.

In order to detect whether that the upper housing 101 and the lower housing 102 are closed, a position detector for detecting the opened/closed position may further be included in the system 200. A switch that can be opened and closed based on the turning motion of the hinge may be used as the position detector. For example, a Hall element may be located in the interior of the upper housing 101, and a magnet may be located in the interior of the lower housing 102. The opened/closed position of the housings 101/102 can be detected as the Hall element and the magnet move away/move closer.

Each set 1 and 1', 2 and 2', ..., 8 and 8', 9 and 9', 10 and 10', ..., 16 and 16' are simultaneously illuminated. In other words, 1' is simultaneously illuminated when illuminating 1. Similarly, 2' is simultaneously illuminated when illuminating 2. Specific illuminating method is as described above in the context of discussions of FIGS. 3-7.

FIG. 9 illustrates an exemplary pattern of lighting units of the portable electronic device 10 in a position in which the upper housing 101 is on the top and the lower housing 102 is on the bottom relative to each other. The position in which the housing 101/102 is opened is described below. As shown in FIG. 9, numbers 1 to 16 are given in ascending order from top to bottom spanning from near the end 104 of the upper housing 101 to near the end 105 of the lower housing 102, where numbers 1 to 16 are given on the right side (edge 120 in FIG. 1B) and numbers 1' to 16' are given on the left side (edge 110 in FIG. 1B).

The lighting module 19 converts the numbers to be continuous natural numbers. In other words, in the upper housing 101 in FIG. 9, the numbers are repeated such that the numbers above and below hinge 103 in the lighting units 1 to 8 on the right side are interchanged. The lighting units 9 to 16 on the left side are renumbered by interchanging the numbers above and below hinge 103, and adding 16.

The control module 18 illuminates the lighting units in ascending order from the LED positioned at the top of the housing (the first LED located near the non-hinged end of the housings such as LED 1 in FIG. 1B). That is, the control module 18 illuminates 1 to 16 and 1' to 16' in the ascending order.

FIG. 10 illustrates an exemplary pattern of lighting units of the portable electronic device 10 in a position in which the lower housing 102 is on the top and the upper housing 101 is on the bottom relative to each other. This is similar to the case of FIG. 9, where numbers 1 to 16 are given in order from top to bottom in ascending order. That is from near the end 104 (FIG. 9) of the lower housing 102 to the near the end 105 (FIG. 9) of the upper housing 101, where numbers 1 to 16 are given on the right side and numbers 1' to 16' are given on the left side of the device 10. In a position the housings are opened, 1 and 1' are symmetrically arranged. The lighting module 19 is illuminated similar to the above-described embodiment after recognizing that 1 and 1' are on the top. Therefore, the visibility improves by arranging a plurality of lighting units in lighting module 19 on the surface of the housing 101/102 of the portable electronic device 10, and controlling the illumination thereof.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying Figures, it is to be noted that changes and modifications may be apparent to those skilled in the art. Such changes and modifications are to be understood as being included within the scope of the present invention as defined by the claims.

What is claimed is:

1. A portable electronic device comprising:
   a housing;
   a plurality of lighting units arranged on a surface of the housing, wherein the plurality of lighting units comprise a first substantially linear arrangement of lighting units and a second substantially linear arrangement of lighting units arranged substantially parallel to the first substantially linear arrangement of lighting units on the surface;

a gradient detector module operable to determine an orientation of the housing; and a control module operable to illuminate the plurality of lighting units based on the orientation of the housing, wherein respective lighting units of the first and second substantially linear arrangement of lighting units are sequentially illuminated in a clockwise or counter-clockwise direction based on the orientation of the housing.

2. The portable electronic device according to claim 1, wherein the plurality of lighting units comprise a lighting unit mounted near a relatively upward end of the housing.

3. The portable electronic device according to claim 2, wherein the lighting unit mounted near the relatively upward end of the housing is mounted on top of the plurality of lighting units.

4. The portable electronic device according to claim 1, wherein the control module is further operable to illuminate at least one of the plurality of lighting units based on detecting a change in a gradient of the orientation of the housing.

5. The portable electronic device according to claim 1, wherein the control module is further operable to detect received information, and to illuminate at least one of the plurality of lighting units in response to detecting the received information.

6. The portable electronic device according to claim 1, wherein the control module is further operable to illuminate a first lighting unit of the plurality of lighting units at a first end of the housing when the first end of the housing is oriented in a relatively upward direction.

7. The portable electronic device according to claim 6, wherein the control module is further operable to illuminate a second lighting unit of the plurality of lighting units at a second end of the housing when the second end of the housing is oriented in a relatively upward direction.

8. A method for illuminating a portable electronic device comprising:

providing a first substantially linear arrangement of lighting units and a second substantially linear arrangement of lighting units arranged substantially parallel to the first substantially linear arrangement of lighting units on a same surface of a housing of the portable electronic device;

determining an orientation of the housing; and sequentially illuminating respective lighting units of the first and second substantially linear arrangement of lighting units in a clockwise or counter-clockwise direction based on the orientation of the housing.

9. The method for illuminating a portable electronic device of Claim 8, further comprising first illuminating a first lighting unit of the first substantially linear arrangement of lighting units, the first lighting unit being located at a first end of portable electronic device, when the first end is higher than a second end of the portable electronic device.

10. The method for illuminating a portable electronic device of claim 9, further comprising illuminating respective ones of the first and second substantially linear arrangement of lighting units sequentially from a first end of the portable electronic device to a second end of the portable electronic device.

11. A method for illuminating a portable electronic device comprising:

providing a plurality of lighting units in a substantially closed loop arrangement on a surface of a housing of the portable electronic device, wherein the plurality of lighting units comprise a first substantially linear arrangement of lighting units and a second substantially linear arrangement of lighting units arranged substantially parallel to the first substantially linear arrangement of lighting units on a same surface of the housing; and illuminating the plurality of lighting units in a clockwise or counter-clockwise direction based on an orientation of the housing.

12. The method for illuminating a portable electronic device of claim 11, wherein the illuminating step starts at a first lighting unit and stops at a second lighting unit.

13. The method for illuminating a portable electronic device of claim 12, wherein the circular pattern is chosen to illuminate a fewest number of the plurality of lighting units.

* * * * *